(12) United States Patent
Yang et al.

(10) Patent No.: US 6,928,119 B2
(45) Date of Patent: Aug. 9, 2005

(54) METHOD OF MPEG-2 VIDEO VARIABLE LENGTH DECODING IN SOFTWARE

(75) Inventors: Jia Quan Yang, Singapore (SG); Sheng Mei Shen, Singapore (SG); Takafumi Ueno, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 332 days.

(21) Appl. No.: 10/303,749

(22) Filed: Nov. 26, 2002

(65) Prior Publication Data

US 2003/0118115 A1 Jun. 26, 2003

(30) Foreign Application Priority Data

Nov. 30, 2001 (JP) ........................................ 2001-366286

(51) Int. Cl.[7] ................................................. H04N 7/12
(52) U.S. Cl. ................................................. 375/240.23
(58) Field of Search ...................... 375/240.01, 240.18, 375/240.2, 240.23–240.26; H04N 7/12

(56) References Cited

U.S. PATENT DOCUMENTS

| | | |
|---|---|---|
| 5,220,325 A | 6/1993 | Ackland et al. |
| 5,623,423 A | 4/1997 | Lipovski |
| 5,940,016 A | 8/1999 | Lee |
| 5,963,260 A | 10/1999 | Bakhmutsky |
| 6,263,019 B1 | 7/2001 | Ryan |
| 6,310,921 B1 | 10/2001 | Yoshioka et al. |
| 6,744,928 B1 | 6/2004 | Juri et al. |
| 2002/0015513 A1 | 2/2002 | Ando et al. |
| 2002/0041626 A1 | 4/2002 | Yoshioka et al. |
| 2003/0043917 A1 | 3/2003 | Bublil et al. |

FOREIGN PATENT DOCUMENTS

| | | |
|---|---|---|
| EP | 0789495 | 8/1997 |
| EP | 0871334 | 10/1998 |
| EP | 0967806 | 12/1999 |
| EP | 0993202 | 12/2000 |
| JP | 2000-50278 | 2/2000 |
| WO | 99/11071 | 3/1999 |
| WO | 99/60521 | 11/1999 |

OTHER PUBLICATIONS

"Information Technology—Generic Coding of Moving Pictures and Associated Audio Information: Video", published in International Standard ISO/IEC 13818–2 First Edition, May 15, 1996, Sections 6.2.3. "Picture header", B.4 "Motion vectors", and B.5 "DCT coefficients".

English Abstracts of No. 2000–50278.

"ITU–T Recommendation H.262, International Standard ISO/IEC 13818.2 MPEG–2 Video Associated Transmission of Non–Telephone Signals. Informatioin Technology—Generic Coding of Moving Pictures and Audio Information: Video," ITU–T Telecommuincations Standardization Sector of ITU, Jul. 1, 1995, pp. 1–211.

An article by D. Ishii et al., entitled "Parallel Variable Length Decoding with Inverse Quantization for Software MPEG–2 Databases", published in Signal Processing Systems, Nov. 3, 1997, pp. 500–509.

An article by V. Lappalainen Ed., entitled "Performance Analysis of Intel MMX Technology for An H.263 Video Encoder" published in Proceedings of the ACM Multimedia 98, Sep. 12, 1998, pp. 309–314.

An article by S. Sriram et al., entitled "MPEG–2 Video Decoding on the TMS32006X DSP Architecture", published in Conference Record of the Thirty–Second Asilomar Conference on Pacific Grove, CA, Nov. 1, 1998, pp. 1735–1739.

*Primary Examiner*—Young Lee
(74) *Attorney, Agent, or Firm*—Greenblum & Bernstein, P.L.C.

(57) ABSTRACT

A method achieves high performance MPEG-2 video variable length decoding as to improve MPEG-2 video decoding process on the whole. The method includes parsing bits, Huffman code decoding for macroblock address increment, decoding motion code, and decoding macroblocks including intra and non-intra macroblocks. This is suitable to any application that are compliant with MPEG-2 MP@ML or MP@ HL video standard. For example, in PC-DTV receiver application, with properly configured PC, one can receive DTV program in real time.

3 Claims, 20 Drawing Sheets

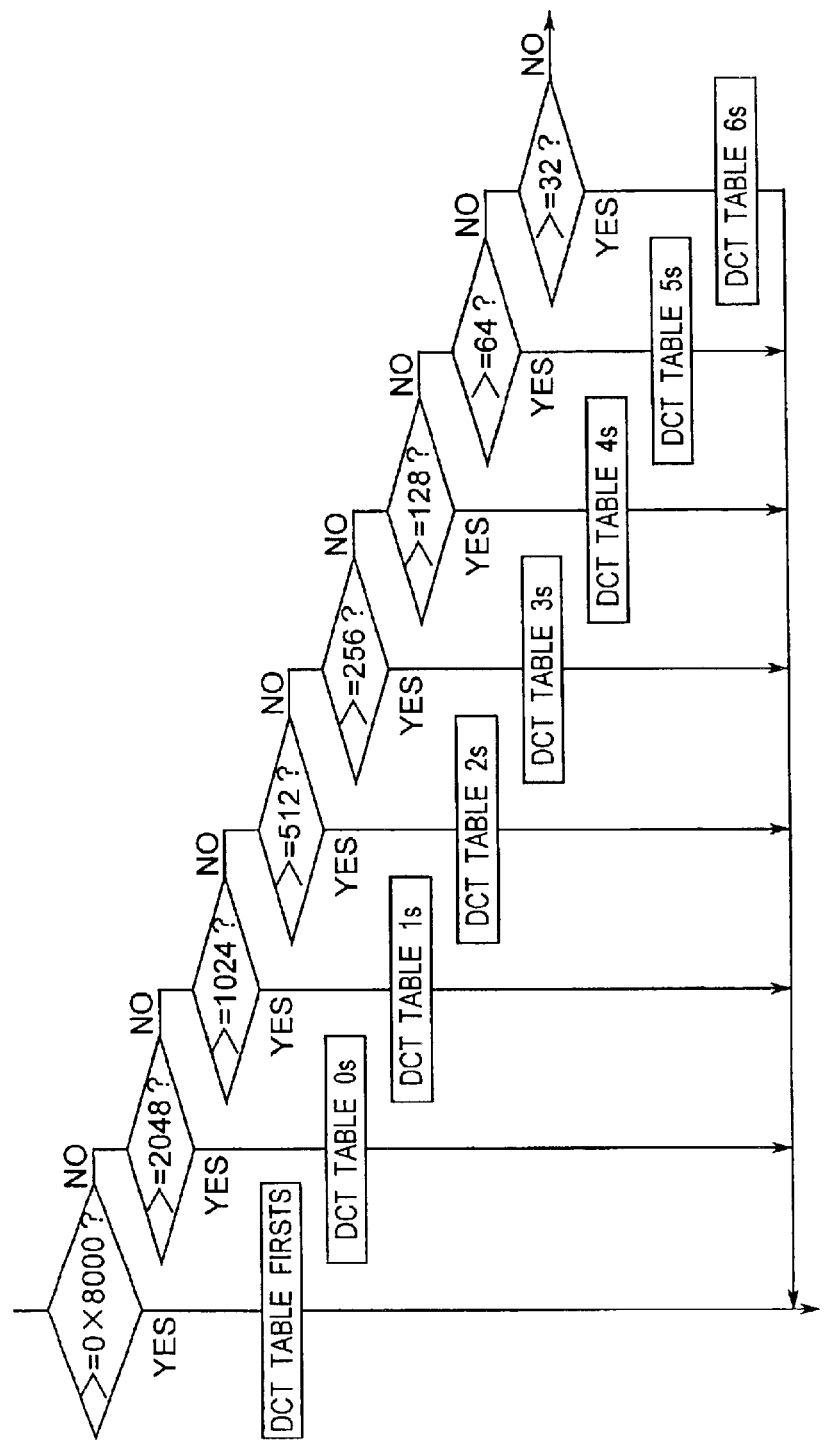

METHOD OF MPEG-2 VIDEO VARIABLE LENGTH DECODING IN SOFTWARE

BACKGROUND OF THE INVENTION

I. Field of the Invention

The invention is very useful in MPEG-2 applications, especially in PC HDTV receiver applications where a large number of bits have to be parsed and decoded fast enough so as to receive HDTV program on a PC in real time. The method introduced in the invention presents a very efficient way to parse and decode MPEG-2 video stream that is continuously received on a PC.

II. Description of the Background Art

Digital TV becomes more and more important and favorable because of its good aspects, such as high quality pictures, robustness to channel noise, multi-channel capability, interactivity, editing capabilities and less transmitting power with equal quality in whole service area. Digital TV programs have been broadcasted by experimental stations in some countries, such as UK, Germany, U.S., Japan and Singapore. In the near future, the commercial and public digital TV stations will be launched on air in most of countries. Household receive the Digital TV program using SDTV set, HDTV set or set-top-box that are very expensive for a lot of families. PC-DTV receiver is a cheaper solution to watch DTV program besides it has better picture quality than TV screen. Adding in the feature of receiving DTV program on a PCs is also helpful to stimulate PC market.

MPEG-2 video and system standards are the main components for DTV broadcasting, used for all different DTV standards. MPEG-2 transport stream standard is adopted for multiplexing, MPEG-2 video MP@ML is adopted for SDTV program, and MPEG-2 video MP@HL is adopted for HDTV program. AC-3, MPEG layer 2 audio, and AAC are the audio standards used in DTV broadcasting for USA, Europe, and Japan respectively. Real time video and audio decoders as well as transport stream demultiplexer are the main development items. Among these items, real time video decoding is the most difficult part, especially for HDTV video decoding.

Video decoding process involves main steps of parsing bits, variable length decoding, inverse discrete cosine transform (IDCT), and motion compensation(MC). In order to achieve real time video decoding, every step should be considered to be optimized further. Upgrading CPU power can speed up the whole processing, however, not only does it increase the whole PC price but it sometimes can not achieve real time video decoding by upgrading CPU power alone. There are graphic card manufacture providing display card that can implement motion compensation to accelerate the decoding process. Some display cards have already supported for both MC and IDCT. Hence, parsing bits and variable length decoding become very important in terms of speeding up the video decoding process, especially HDTV video because of its large number of bits.

The existing methods of parsing bits and variable length decoding are not fast enough under certain CPU power to achieve real time video decoding. There is a big room to be improved. The faster the parsing bits and variable length decoding, the less CPU power required so that the PC-DTV receiver functionality can be achieved under lower price. Even in the future as the hardware price going down, the improved method will take less CPU power so that more applications can be run concurrently.

There are many ways to implement MPEG-2 variable length decoding from parsing bits to Huffman variable length code decoding. Some parse bits using byte by byte method, using two 32-bit integers 32-bit by 32-bit method, or using field structure to get the value of certain bits from decoding buffer. Some decode macroblock address increment by checking macroblock escape code first; some decode motion code by first decoding the absolute value of motion code then sign bit; some decode DCT coefficients of macroblocks by first decoding the absolute value then sign bit. It should be noted that those methods are slow and not exactly suitable for DTV receiver application.

The conclusion is that it is necessary to provide such an efficient method to improve video decoding process for PC-DTV receiver application, especially for HDTV application.

On a PC configured with Intel Pentium® 3 processor, to achieve high performance decoding process is to highly utilize 32-bit operation and MMX instruction besides the good algorithms. In MPEG-2 standard, certain number of bits stands for the meaningful value, and the number of bits ranges from 1 to 32. For example, the start code prefix is a string of twenty-three bits with the value zero followed by a single bit with the value one. The start code prefix is thus the bit string '0000 0000 0000 0000 0000 0001'. The sequence start code is a string of 32 bits with the hexadecimal value 0x1B3. The string '0000 1011' in variable length code for motion code stands for the value −5.

In order to optimize MPEG-2 video variable length decoding in performance, it is necessary to design methods to highly utilize the 32-bit operation and MMX instruction, and it is necessary to design methods to follow the optimization rules in term of the use of Intel Architecture. Fully understanding MPEG-2 video standard and highly understanding the Intel Architecture is needed to design such high performance methods.

A decoder that parses bits using byte by byte method does not utilize the 32-bit operation; a decoder that parse bits using two 32-bit integers 32-bit by 32-bit method does not utilize MMX instructions; a decoder that parse bits using field structure to get the value of certain bits from decoding buffer will involve a lot of computation from assembly point of view. Hence they are slow.

Further, a decoder that decodes macroblock address increment by first checking macroblock escape code is slower than that by first checking the increment value one for I-picture decoding, since all macroblock address increment have the increment value one in I-picture.

When a decoder decodes motion code by first decoding the absolute value of motion code, then sign bit is slower than that by decoding the signed value of motion code using the properly designed variable length motion code tables. When a decoder decodes DCT coefficients in macroblocks by first decoding the absolute value then sign bit is slower than that by decoding the signed value of DCT coefficients using the properly designed DCT coefficient variable length code tables.

SUMMARY OF THE INVENTION

It is an object of the present invention to highly utilize 32-bit operation and MMX instructions for parsing bits functions, to decode macroblock address increment by first checking the increment value one, to decode motion code using the properly designed variable length motion code tables including sign bit, and to decode DCT coefficients using the properly designed DCT coefficient variable length code tables including sign bit.

A method according to the present invention includes the followings:

The means of parsing bits using embedded assembly instructions and MMX technology in the video decoder, which includes steps of initializing a 64-bit buffer using the embedded assembly instructions, peeking the value of certain bits from said 64-bit buffer using embedded assembly instructions, flushing certain bits from said 64-bit buffer, and obtaining the value of certain bits from said 64-bit buffer;

The means of decoding macroblock address increment by first checking the increment value one;

The means of decoding motion vectors using the new designed variable length motion code tables including sign bit;

The means of clearing macroblock using MMX technology; and

The means of decoding DCT coefficients of macroblock using the new designed DCT coefficient variable length code tables including sign bit, which includes steps of decoding DCT coefficients for an intra macroblock with intra vlc format, decoding DCT coefficients for an intra macroblock with non-intra vlc format, or decoding DCT coefficients for non-intra blocks.

Operation according to the present invention is as follows:

A PC receives digital TV program;

demodulator demodulates RF signal into MPEG-2 Transport Stream,

TS demultiplexer demultiplexes MPEG-2 Transport Stream into MPEG-2 video and audio;

TS demultiplexer store the MPEG-2 video bitstream into a ring buffer, and here we use 3 MB;

TS demultiplexer store the audio bitstream into a ring buffer, and here we use 1 MB;

video decoder reads bitstream from said 3 MB ring buffer into the video decoding buffer and transmits the bits from said video decoding buffer to a 64-bit buffer that is an unsigned 64-bit integer or quadword;

video decoder decodes the video through said 64-bit buffer into uncompressed video frames;

audio decoder reads bitstream from said 1 MB ring buffer into the audio decoding buffer; and audio decoder decodes the audio over said audio decoding buffer into uncompressed audio frames.

Both video and audio are presented synchronously and respectively to display device and sound device.

According to the method presented in the invention is very useful in MPEG-2 video variable length decoding, especially for MP@HL video sequence. The method achieves very fast decoding speed in term of variable length decoding. With the high performance variable length decoding method, the video decoder can achieve real time decoding of HDTV sequence with hardware assisted IDCT and MC under Intel® Pentium® 3 733 MHz CPU.

It is very practical to implement the method and very easy to be used in MPEG-2 application. For instance, PC-DTV receiver application. Having the decoding software installed on the PC, one can enjoy the high quality DTV program. PC-DTV is a cheaper solution to watch digital TV program and has better picture quality because of PC monitor.

BRIEF DESCRIPTION OF THE DRAWINGS

This and other objects and features of the present invention will become clear from the subsequent description of a preferred embodiment thereof made with reference to the accompanying drawings, in which like parts are designated by like reference numerals and in which:

FIG. 20 is a flowchart of selecting DCT Tables for the first AC coefficient of blocks of non-intra macroblock;

DETAILED DESCRIPTION OF THE PREFERRED EMBODIMENTS

Referring now to the attached figures, preferred embodiments of the present invention will be described as follows.

One of MPEG-2 Applications

Figure 1:
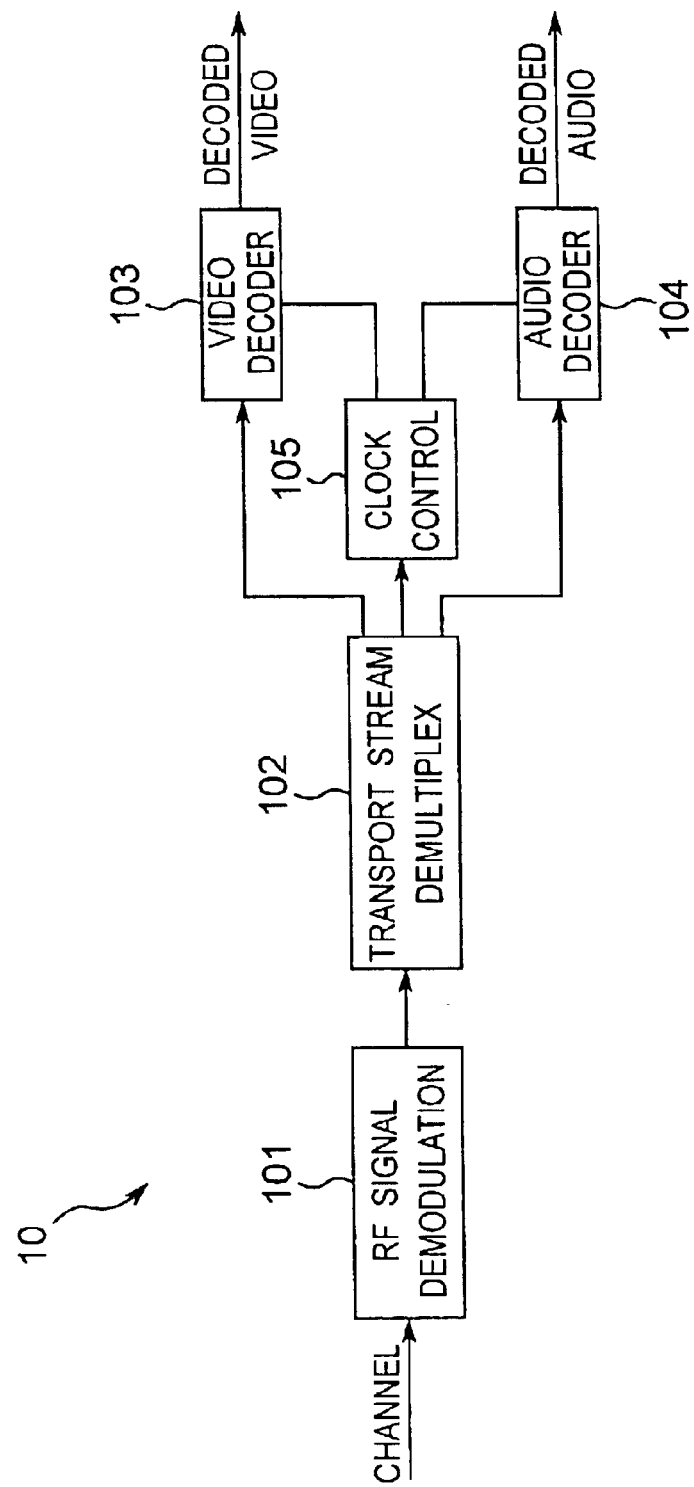
FIG. 1 is a block diagram of a PC-DTV receiver.

FIG. 1 shows a block diagram of a PC-DTV receiver 10 as one of MPEG-2 applications. A PC-DTV receiver 10 receives digital TV program ( Demodulator 101 demodulates RF signal into MPEG-2 Transport Stream (TS). Demultiplexer 102 demultiplexes TS into MPEG-2 video and audio. Video decoder 103 decodes the video into uncompressed video frames. Audio decoder 104 decodes the audio into uncompressed audio frames. Because video decoder 103 and audio decoder 104 receives a clock signal from clock control 105, both decoded video and audio are presented synchronously and respectively to display device and sound device.

A Typical MPEG-2 Video Decoding Process

Figure 2:
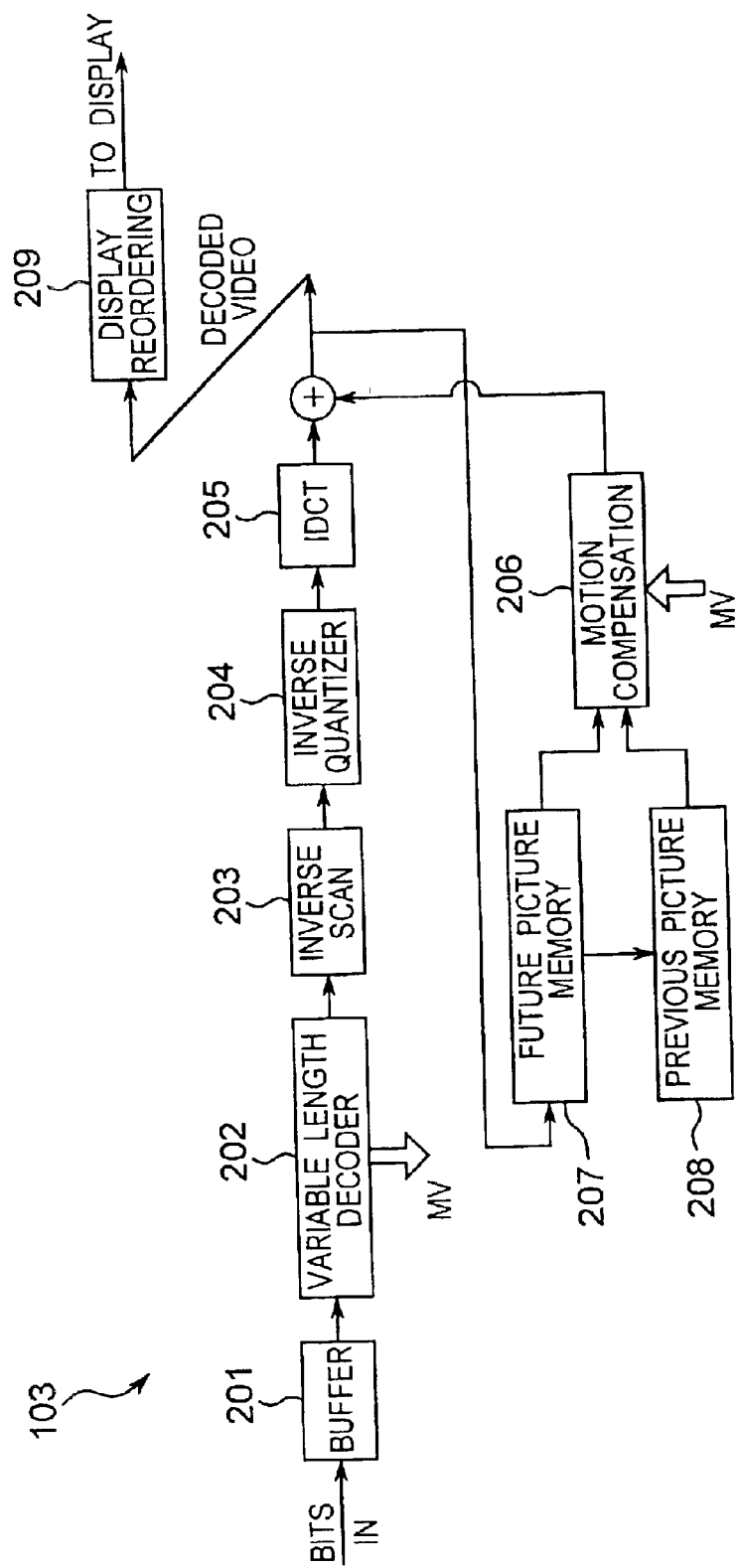
FIG. 2 is a typical MPEG-2 video decoding process.

FIG. 2 shows a typical MPEG-2 video decoding process. A video decoder 103 reads and temporarily stores bitstream in buffer 201. The video decoder 103 performs variable length decoding (VLD) in block 202, inverse scanning in block 203, inverse quantizing in block 204, inverse DCT in block 205, and motion compensation in block 206. Finally, The video decoder 103 performs display re-ordering in block 207. VLD 202 parses bits, decodes Huffman codeword, such as DCT coefficients, and generates motion vectors (MVs). Inverse scan 203 converts the decoded DCT coefficients from one dimension into two dimension by 8×8 blocks. Inverse quantizer 204 is to recover the quantized DCT coefficients by using quantiser matrix Inverse DCT 205 transforms the DCT coefficients in frequency domain into pixel values in time domain. Motion compensation 206 compensates motion in pictures based on future picture (predictions) in block 207, previously decoded pictures (previous pictures) in block 208, and MV. In other words, future pictures and previous pictures are combined in block 206 with the coefficient data from the output of the IDCT 205 in order to recover final decoded samples. Display re-ordering 209 outputs frames to display device in display order.

The input to the decoding process of video decoder 103 is the coded video bitstream, while the output is a series of frames that are normally the input to a display process. The order in which frames are output by the decoding process is called display order. The display process is responsible for the action of displaying the decoded frames on a display device.

Bitstream Data Flow of Video Decoding Process in the Invention

Figure 3:
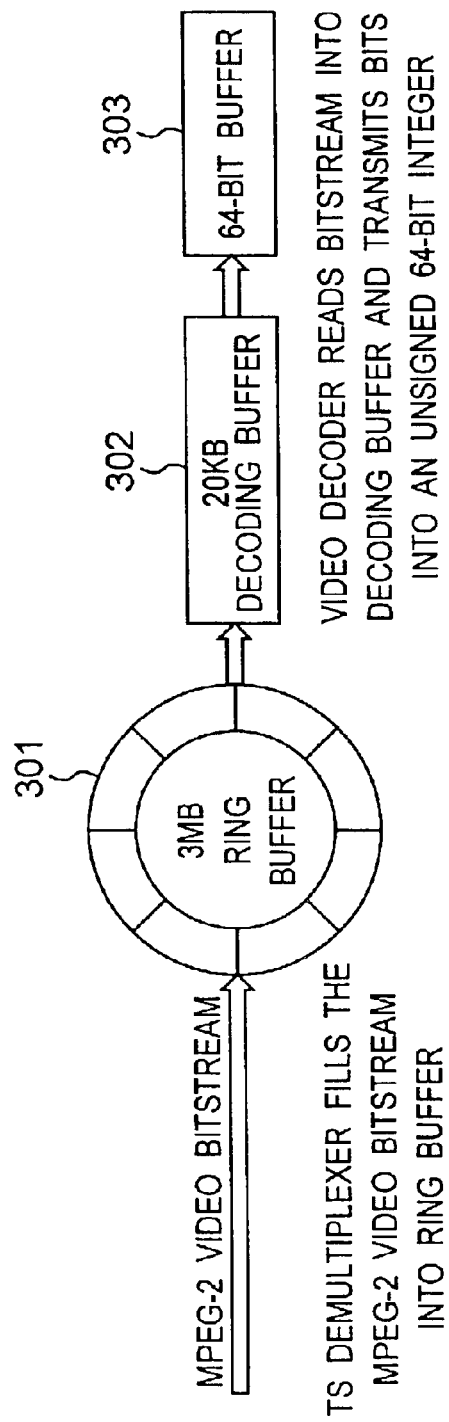
FIG. 3 is the bitstream data flow of MPEG-2 video decoding process.

As shown in FIG. 3, MPEG-2 video bitstream is pushed into a 3MB ring buffer 301, video decoder 103 (FIG. 2) reads data from ring buffer 301 and store the data into decoding buffer 302, the parsing bits functions get bits from decoding buffer 302 into 64-bit buffer 303. Video decoder 103 calls the parsing bits functions to do variable length decoding, that is, to decode variable length Huffmam codeword, and extract header information. Video decoder 103 does IDCT and MC to construct frames by using the output of VLD and outputs the frames in display order to display device.

Bytes, Words, Doublewords, and Quadwords in Memory

Figure 4:
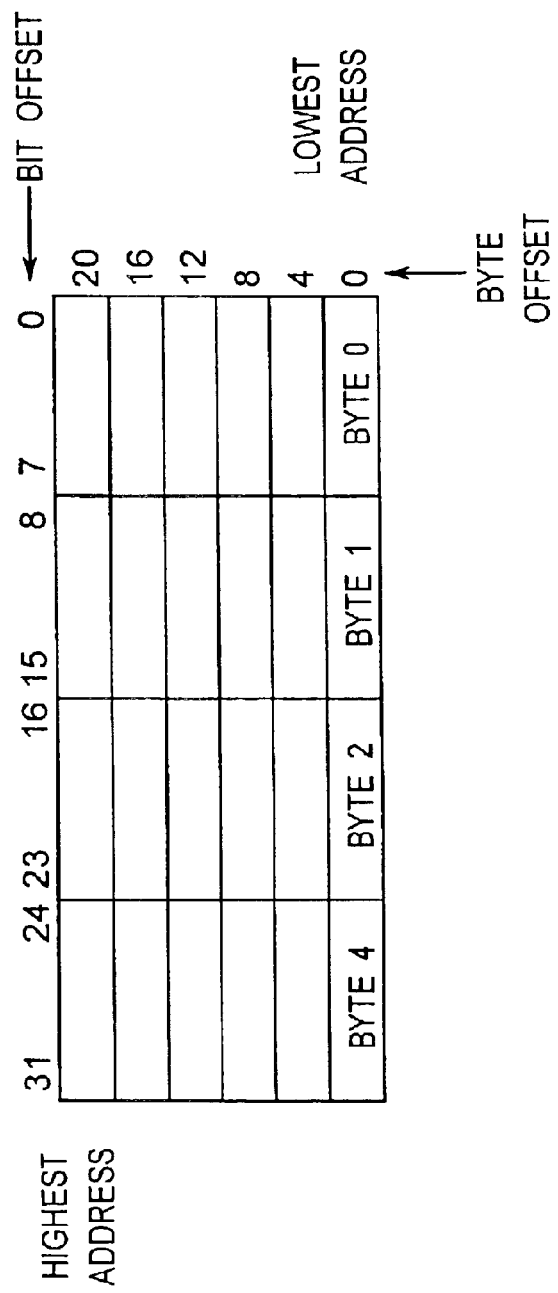
FIG. 4 is an illustration of data structure—bit and byte order in memory.
Figure 5:
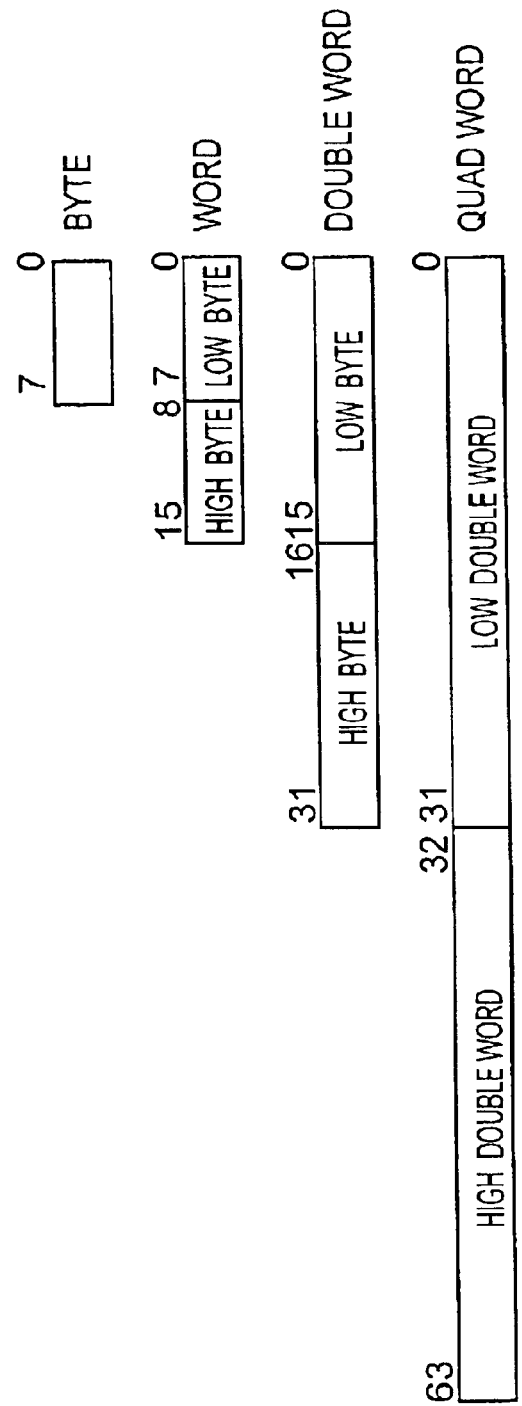
FIG. 5 is a diagram of fundamental data types.
Figure 6:
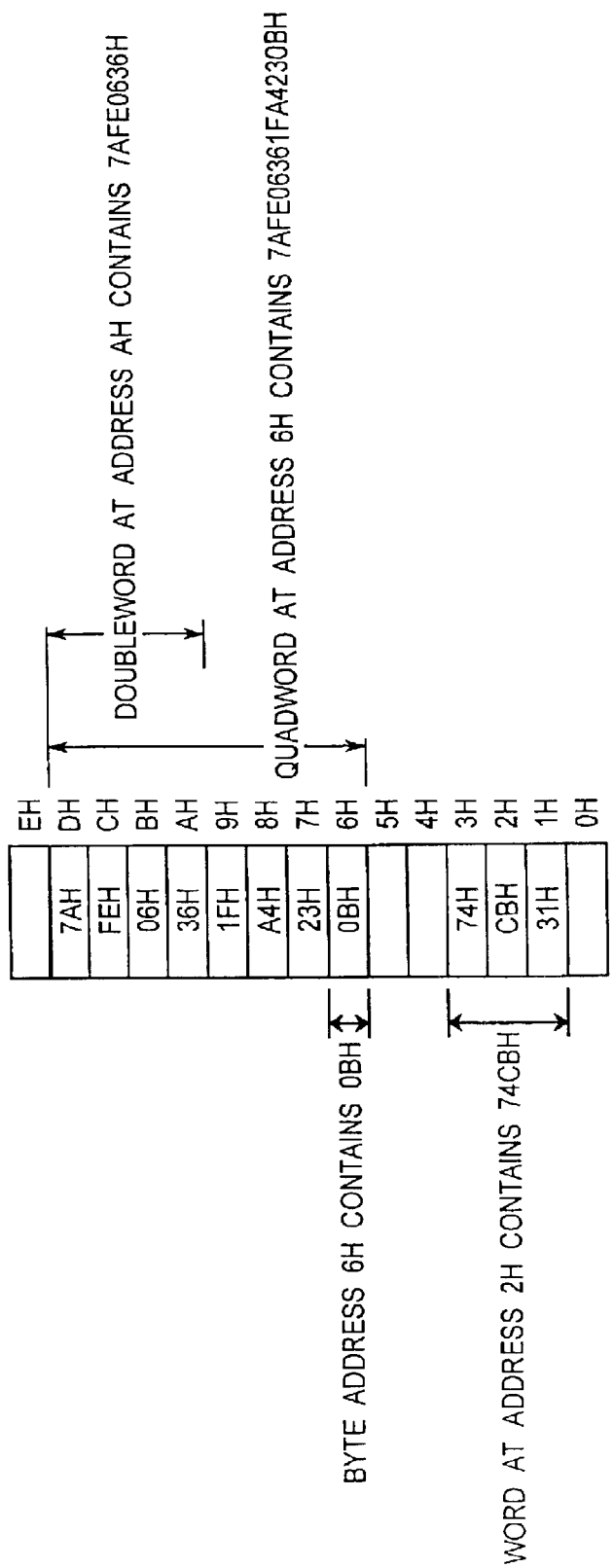
FIG. 6 is a diagram of Bytes, Words, Doublewords, and Quadwords in Memory.

In order to better present the method of parsing bits, FIGS. 4 to 6 give basic knowledge. FIG. 4 illustrates data structure in memory, smaller addresses appear toward the bottom of the figure; address increase toward the top. Bit positions are numbered from right to left. A numerical value of a set bit is equal to two raised to the power of the bit position. The bytes of a word are numbered starting from the least significant byte.

FIG. 5 illustrates fundamental data types of the Intel Architecture (IA) that are bytes, words, doublewords, and quadwords. A byte is eight bits, a word is 16 bits, a doubleword is 32 bits, and a quadword is 64 bits. FIG. 6 illustrates a example of bytes, words, doublewords, and quadwords in memory. Words, doublewords, and quadwords do not need to be aligned in memory on natural boundaries. The natural boundaries for words, double words, and quadwords are even-numbered addresses, addresses evenly divisible by four, and addresses evenly divisible by eight, respectively.

However, to improve performance of programs, data structures especially stacks should be aligned on natural boundaries whenever possible. In a quadword, the least significant byte presents the least significant two hexadecimal digital number, and the most significant byte presents the most significant two hexadecimal number. Likewise, the low doubleword and the high doubleword have the same rule as the quadword does.

Parsing Bits Using Embedded Assembly Instructions and MMX Technology

Initializing a 64-bit Buffer Using the Embedded Assembly Instructions

As mentioned bitstream data flow of video decoding process in the invention shown in FIG. 3, the video decoder 103 (FIG. 2) reads data from 3 MB ring buffer 301, stores them into decoding buffer 302, and transmits bits from decoding buffer 302 into 64-bit buffer 303. Parsing bits functions obtains the value of certain bits through 64-bit buffer 303.

Figure 7:
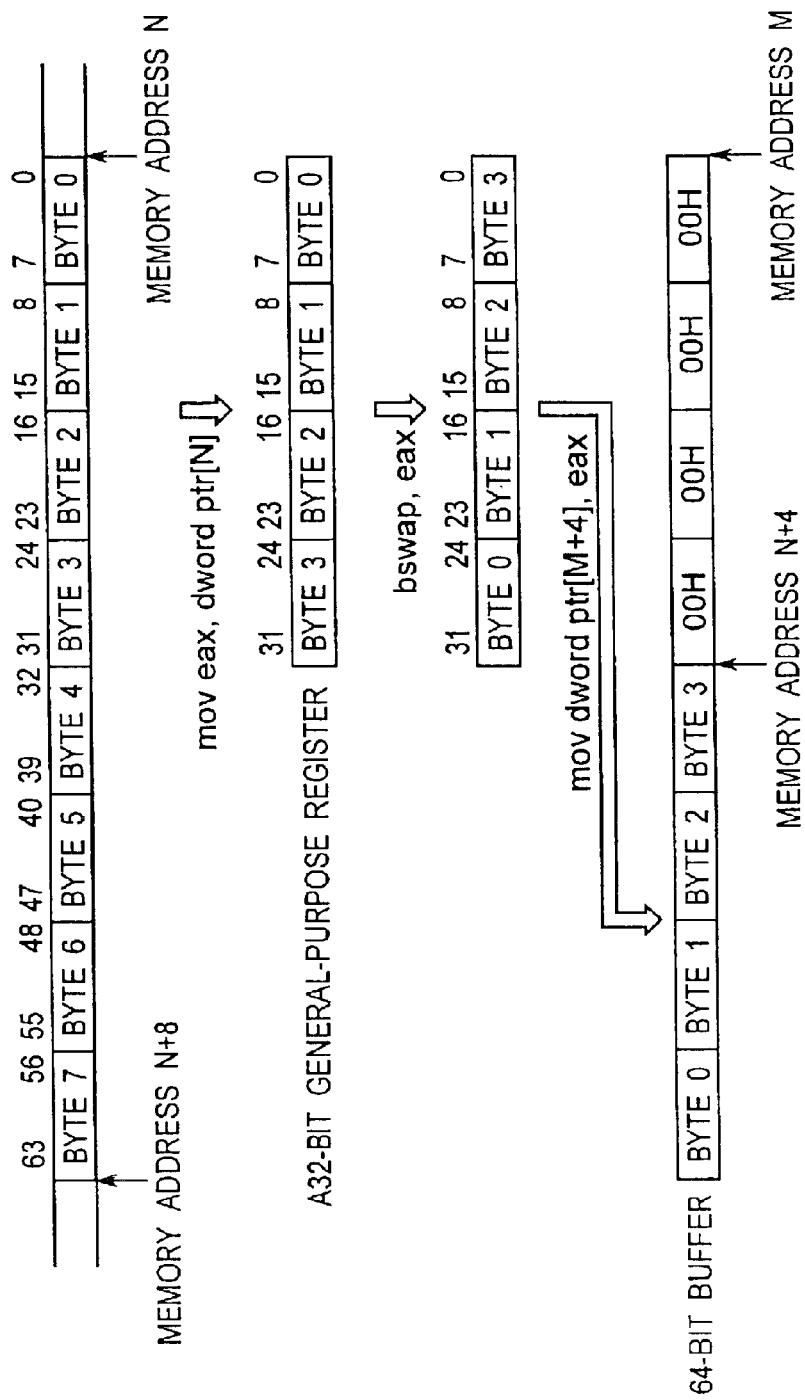
FIG. 7 is a diagram of initialization of the 64-bit buffer—unsigned 64-bit integer.

FIG. 7 illustrates an initialization of 64-bit buffer 303 (FIG. 3). Video decoder 103 first fills decoding buffer 302 by using bitstream data from 3MB ring buffer 301 and fills 32 bits into 64-bit buffer 303. As shown in FIG. 7, memory address N presents the address of the decoding buffer 302, 32 bits are moved into a 32-bit General-Purpose Register EAX, the byte order of the register EAX is exchanged by the bswap instruction: bits 0 through 7 are swapped with bits 24 through 31, and bits 8 through 15 are swapped with bits 16 through 32. The new value in EAX is stored in the high doubleword in said 64-bit buffer. After this initialization, the 64-bit buffer contains 32 bits valid.

Peeking the Value of Certain Bits from said 64-Bit Buffer

Peeking the value of certain bits does not need to flush the number of bits that have been peeked. Video decoder 103 may peeks certain bits, for example, twenty-four bits to look for the start code prefix; if the value of the twenty-four bits is not equal to 0x000001 in hexadecimal, the decoder discards 8 bits and continue to look for the start code prefix. For more example, to decode macroblock address increment, the decoder may peeks 11 bits, and if the value of the 11 bits is either greater than or equal to 1024, the decoder flushes 1 bit and get the macroblock address increment value one.

Figure 8:
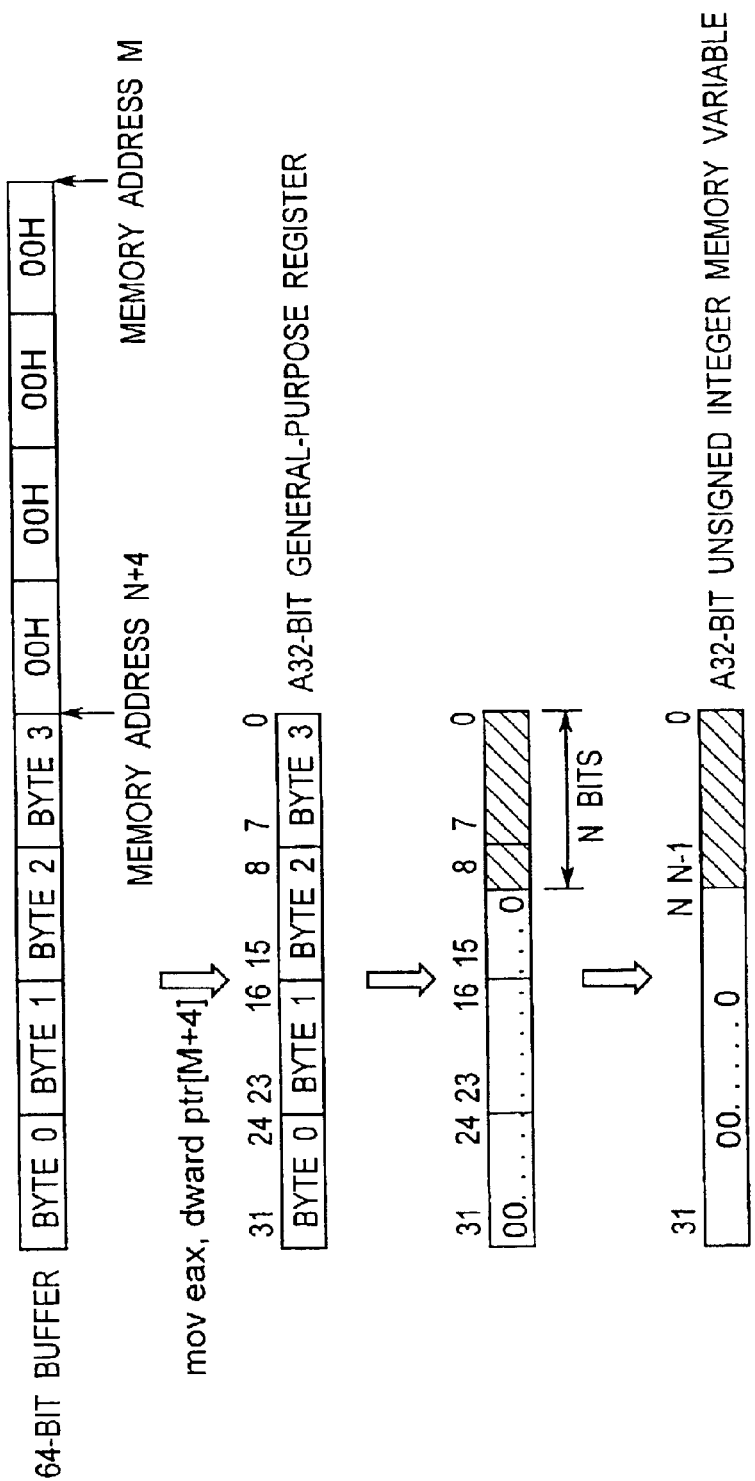
FIG. 8 is a diagram of method of peeking an N bits value.

As shown in FIG. 8, video decoder 301 peeks the integer value of N bits. The high double word of the said 64-bit buffer 303 is moved into a 32-bit General-Purpose Register EAX, shift right EAX 32-N bits, EAX then contains the value of N bits. Using the instruction MOV stores the EAX value to an unsigned integer memory variable.

Flushing Certain Bits from said 64-Bit Buffer

The decoder may flushes bits after peeking the value of certain bits. For example, the sequence header code is the bit string '000001B3' in hexadecimal; it is a 32 bits string in binary. Following it, the next 12 bits is the horizontal size value that forms the 12 least significant bits of horizontal size of the picture. The video decoder 103 first flushes bits that ranges from 1 to 7 if the current position is not byte aligned. The decoder 103 then flushes 8 bits by 8 bits until the sequence start code is found. After peeking the sequence start code, the decoder 103 flushes 32 bits in order to decoder the value of the next 12 bits that is horizontal size value.

Figure 9:
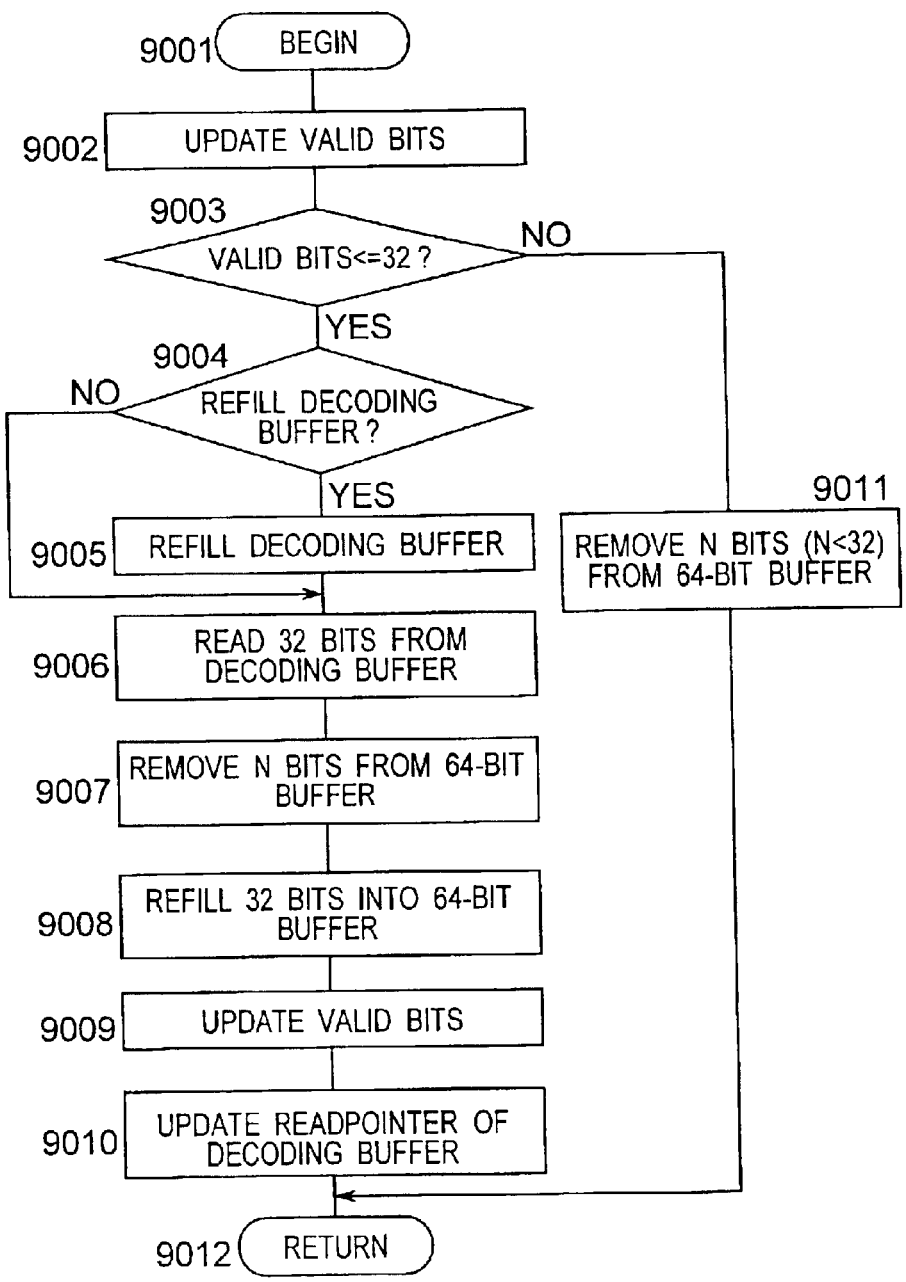
FIG. 9 is a flowchart of the flushing bits.

FIG. 9 illustrates a flowchart of the flushing bits function that discards the bits that have been peeked in the said 64-buffer. As shown in FIG. 9, module 9001 is a normal begin point. Module 9002 updates the number of valid bits. The number of the updated valid bits M is equal to the number of the previous valid bits minus the number of bits N to be flushed. Module 9003 checks if the number of updated bit M is either less than or equal to 32. If yes, goes to module 9004 since refilling 32 bits into the 64-bit buffer is required, otherwise, goes to module 9012. Module 9004 checks if the decoding buffer needs to be refilled. If yes, goes to module 9005, otherwise, goes to module 9006. Module 9005 refills the decoding buffer and updates the reading pointer of the decoding buffer. Module 9006 reads 32 bits from the decoding buffer. Module 9007 removes N bits from the 64-bit buffer. Module 9008 refills 32 bits into the 64-bit buffer. Module 9009 updates the number of valid bits that is equal to M plus 32. Module 9010 updates the reading pointer of the decoding buffer. Module 9011 removes N bits from the 64-bit buffer, in this case, the N is less than 32. Module 9012 is normal function return without return value.

Figure 10:
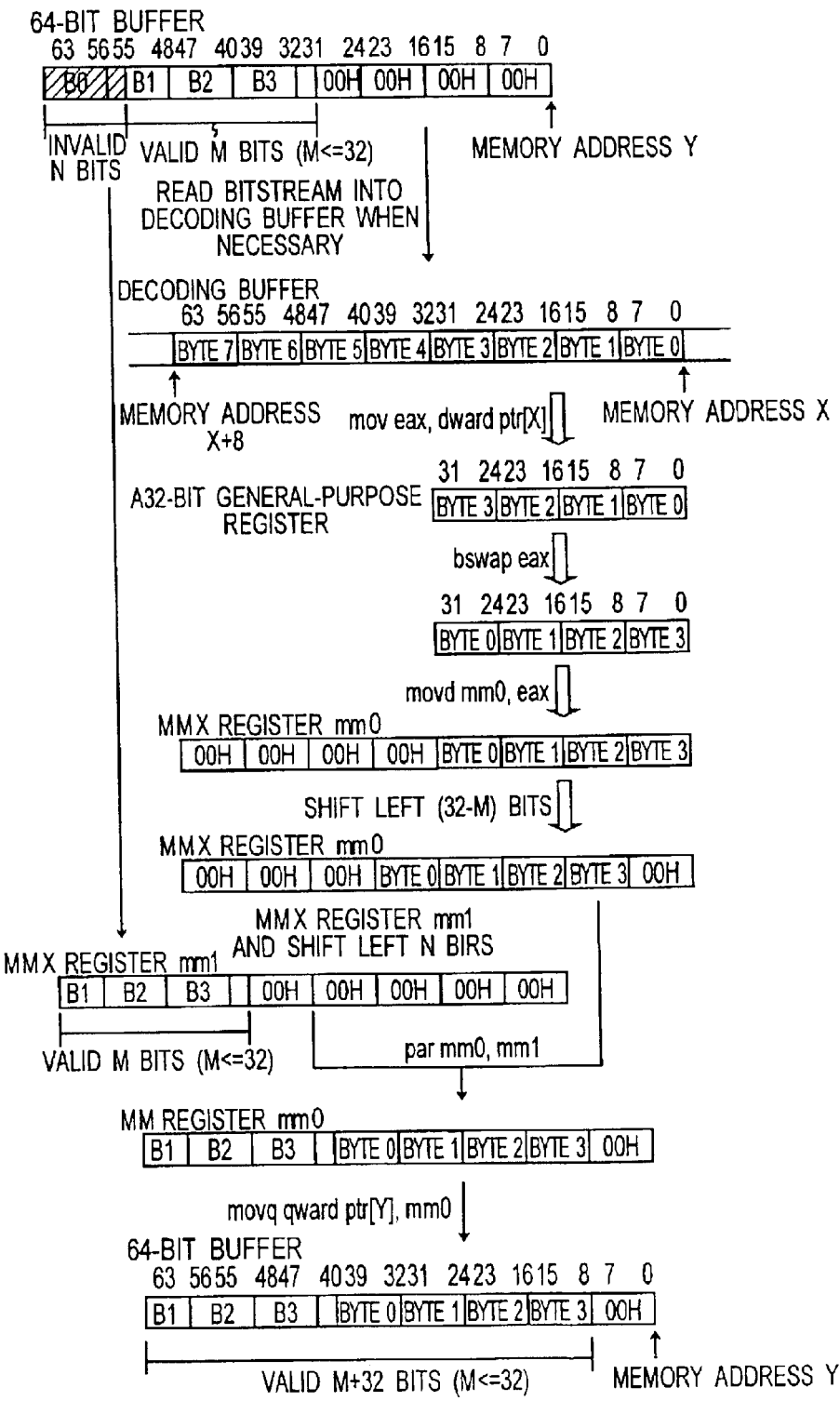
FIG. 10 is a diagram of flushing bits with refilling bits.

FIG. 10 further illustrates modules 9006, 9007, 9008, and 9009 in FIG. 9. As shown in FIG. 10, a value in 64-bit buffer 303 is moved into MMX register mm1 and shift left N bits, and the number of updated valid bits is M. 32 bits from decoding buffer 302 are moved into a 32-bit General-Purpose Register EAX. The bswap instruction exchanges the byte order. The instruction movd moves EAX value to MMX register mm0. Then shift left mm0 32-M bits. The mm0 and mm1 are merged into mm0. The instruction movq stores mm0 value into the 64-bit buffer. Now the number of valid bits is M+32.

Figure 11:
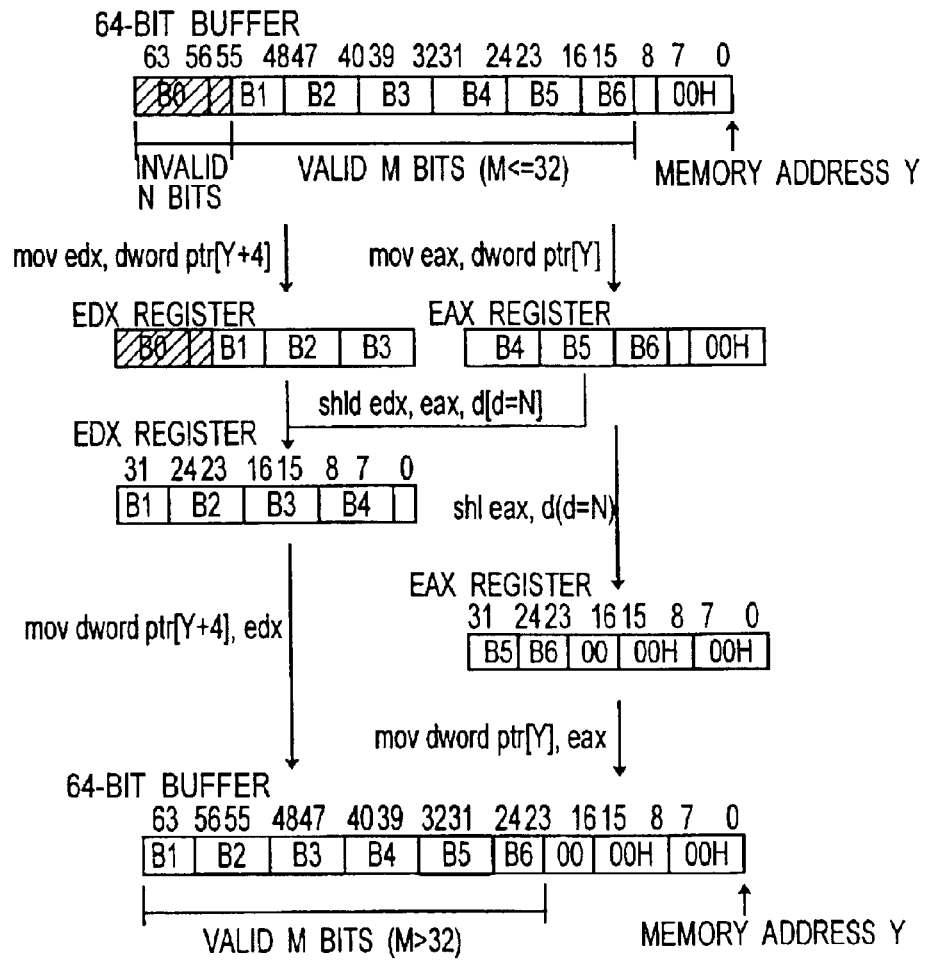
FIG. 11 is a diagram of flushing bits without refilling bits.

FIG. 11 further illustrates module 9011 in FIG. 9. As shown in FIG. 11, the high double word is moved into EDX register and the low double word is moved into EAX register. The SHLD instruction is applied to move out the most significant N bits from EDX meanwhile the most significant N bits from EAX is moved into the least significant N bits in EDX. The instruction SHL is applied to shift left N bits from EAX as to move out the most significant N bits. Store EDX to the high double word and EAX to the low double word of 64-bit buffer 303.

Obtaining the Integer Value of Certain Bits from said 64-Bit Buffer

To obtain an integer value of N bits is to peek the integer value of N bits and flush N bits. For example, video decoder 103 decodes the picture coding type in picture header that is presented by 3 bits according to the specification ISO/IEC 13818-2 6.2.3. The decoder first peeks the integer value of 3 bits and stores the value to the picture coding type variable in memory, then flush 3 bits.

As described above, the high performance method of parsing bits is introduced. During our research on the methods of parsing bits, the method in the invention is the fastest to parse bits of MPEG-2 video bitstream.

Decoding Macroblock Address Increment by First Checking the Increment Value One

Figure 12:
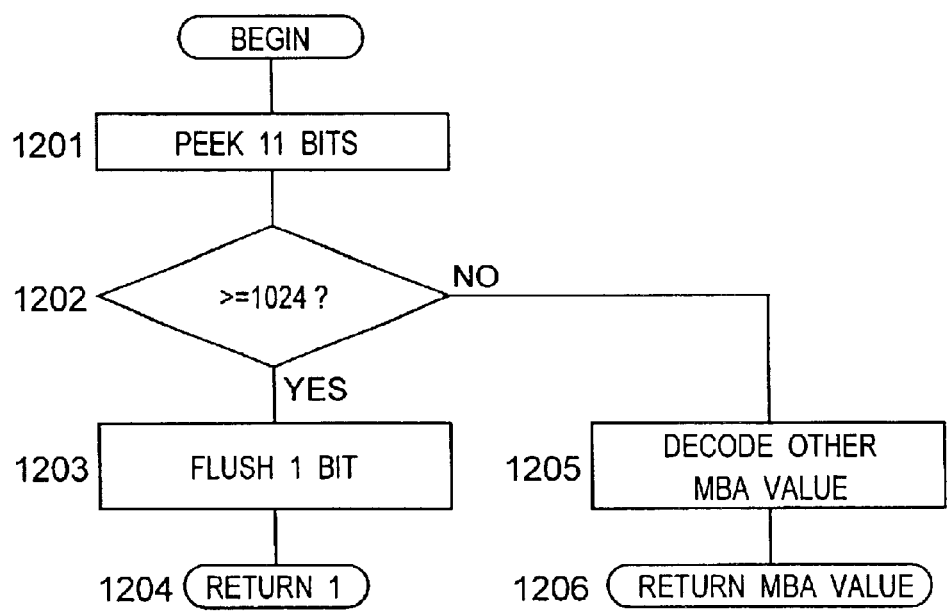
FIG. 12 is a flowchart of decoding macroblock address increment by first checking increment value one.

FIG. 12 illustrates a flowchart of decoding macroblock address increment. The decoder first peeks 11 bits in module 1201. This means peeking the value of 11 bits without flushing bits. In module 1202, if the peeked value is either greater than or equal to 1024, MBA has an increment value one and the function flushes 1 bit in module 1203 and return 1 in module 1204. If the peeked value is less than 1024 in module 1202, the function decode other macroblock address increment value in module 1205 and return the decoded value in module 1206 accordingly. This method can speed up I-picture decoding process since all macroblocks in I-picture has the macroblock address increment value one. Checking the macroblock address increment value one first is to avoid unnecessary checking in case of I-picture.

Decoding Motion Vectors Using the New Designed Variable Length Motion Code Tables Including Sign Bit According to the specification ISO/IEC 13818-2B.4 Motion vectors Table B-10—Variable length codes for motion code, the maximum length of variable length code is 11 bits and the minimum length is 1 bit. Initially, the flow starts by obtaining the value of 1 bit in module 1301. If the most significant bit is determined to be '1' in module 1302, motion code has value zero in module 1303. For the next 10 bits, bits from '001 0' to '11' have values ranging between 3 to 1 and −3 to −1; bits from '000 0110' to '000 111' have values ranging between 7 to 4 and −7 to −4; bits from '000 0011 000' to '000 0101 11' have values ranging between 16 to 8 and −16 to −8. So, three new designed variable length motion code tables including sign bit are established as follows in C language:

```
typedef struct {
    char value
    char length_of_variable_length_code;
} VLCtab;
static VLCtab MVtab0[16] =
{
        {ERROR,0}, {ERROR,0}, {3,4}, {-3,4},
        {2,3}, {2,3}, {-2,3}, {-23},
        {1,2}, {1,2}, {1,2}, {1,2},
        {-1,2}, {-1,2}, {-1,2}, {-1,2}
};
static VLCtab MVtab1[10] =
{
        {7,7}, {-7,7},
        {6,7}, {-6,7}, {5,7}, {-5,7},
        {4,6}, {4,6}, {-4,6}, {-4,6}
};
static VLCtab MVtab2[24] =
{
        {16,10}, {-16,10}, {15,10}, {-15,10},
        {14,10}, {-14,10}, {13,10}, {-13,10},
        {12,10}, {-12,10}, {11,10}, {-11,10},
        {10,9}, {10,9}, {-10,9}, {-10,9},
        {9,9}, {9,9}, {-9,9}, {-9,9},
        {8,9}, {8,9}, {-8,9}, {-8,9}
};
```

Figure 13:
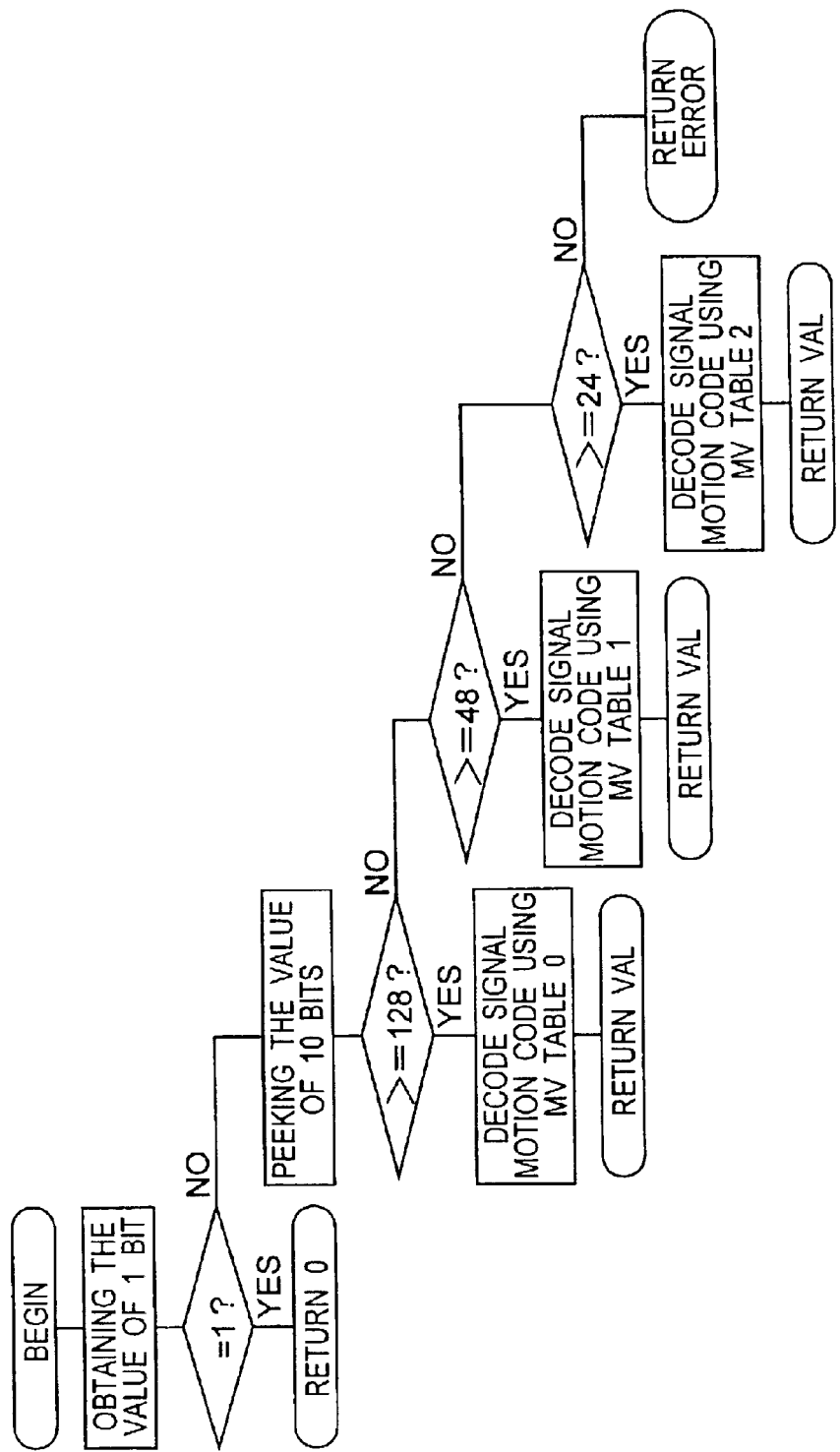
FIG. 13 is a flowchart of decoding motion code using the new designed variable length code tables including sign bit.

The decoding flow shown in FIG. 13 is designed to decode motion code. As shown in FIG. 11, if the first 1 bit value is equal to 1, the function returns zero; otherwise, the function peeks the value of next 10 bits and decides which motion code table is going to be used to decode motion code.

Decoding DCT Coefficients of Macroblock Using the New Designed DCT Coefficient Variable Length Code Tables Including Sign Bit According to the specification ISO/IEC 13818-2 B.5 DCT coefficients, Table B-12 and Table B-13 are variable length codes for DCT DC coefficients. Table B-14 is for both intra macroblocks with non-vlc format and non-intra macroblocks. Table B-15 is for intra macroblocks with vlc format. DCT coefficient variable length code tables including sign bit are established according to the above characteristics.

Figure 14:
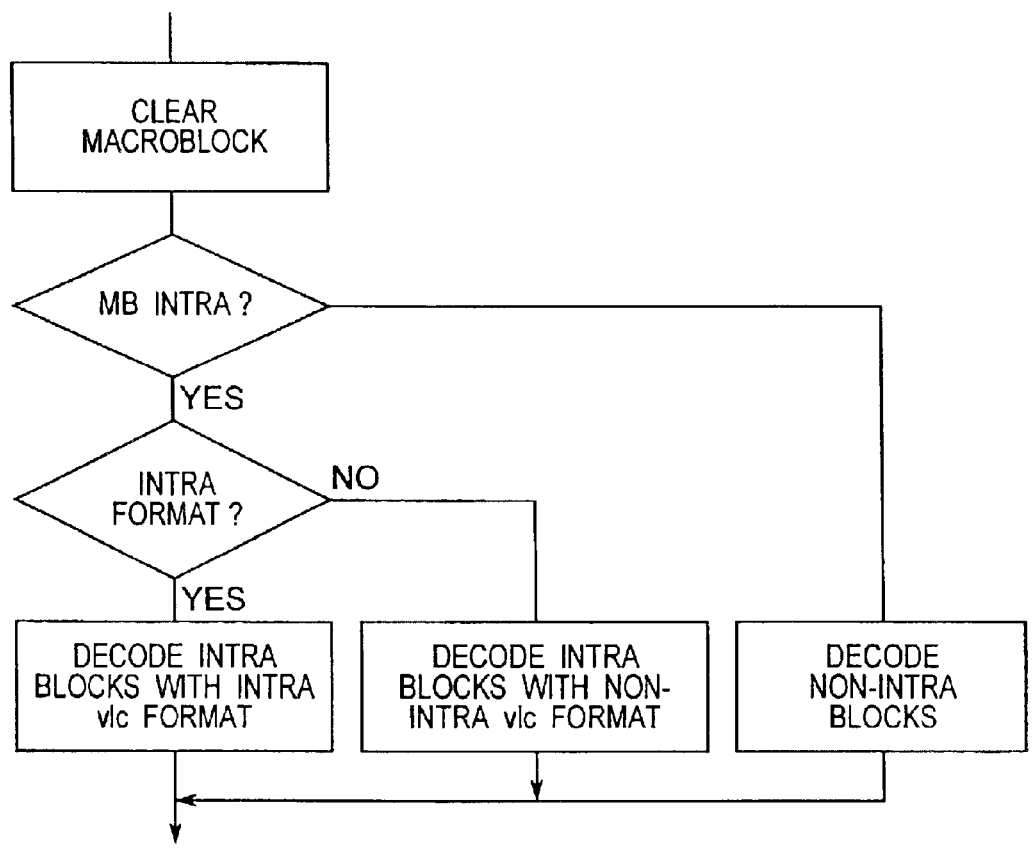
FIG. 14 is a flowchart of decoding a macroblock in the invention.

FIG. 14 illustrates a flowchart of decoding macroblocks. It includes clearing macroblock module, cecoding intra blocks with intra vlc format module, decoding intra blocks with non-intra vlc format module, and decoding non-intra blocks module.

Clearing Macroblock Using MMX Technology

Figure 15:
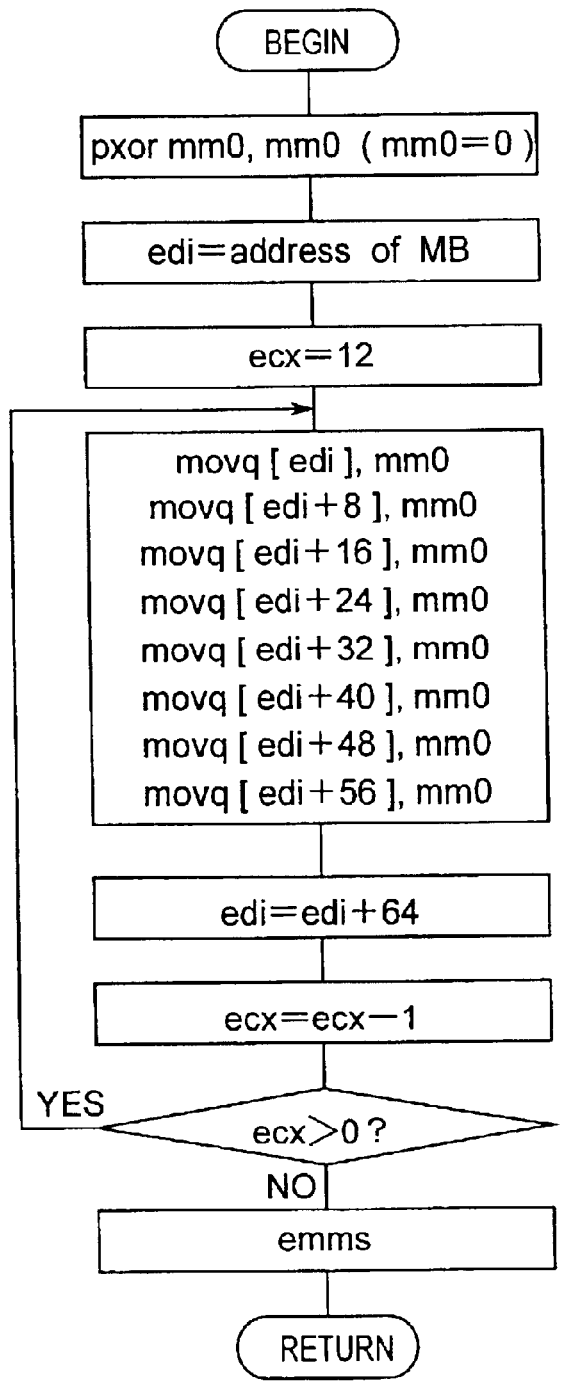
FIG. 15 is a flowchart of clearing a macroblock using MMX technology.

A macroblock is defined as 'short block[6][64]' in C language for decoding 4:2:0 format video, so the total number of bytes is 768 (2×6×64). FIG. 15 illustrates a flowchart of clearing a macroblock using MMX technology. As shown in the Figure, there are 12 iterations managed by argument "ecx" and each iteration clears 64 bytes. This is very fast way to clear macroblocks.

Decoding DCT Coefficients for an Intra Macroblock with Intra vlc Format

Figure 16:
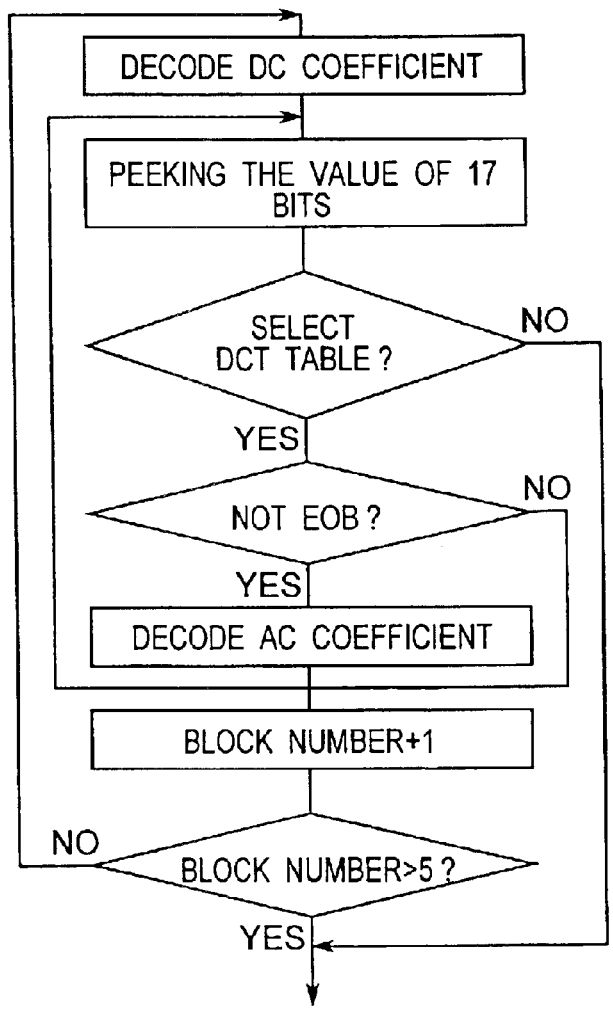
FIG. 16 is a flowchart of decoding DCT coeffiecients for an intra macroblock.
Figure 17:
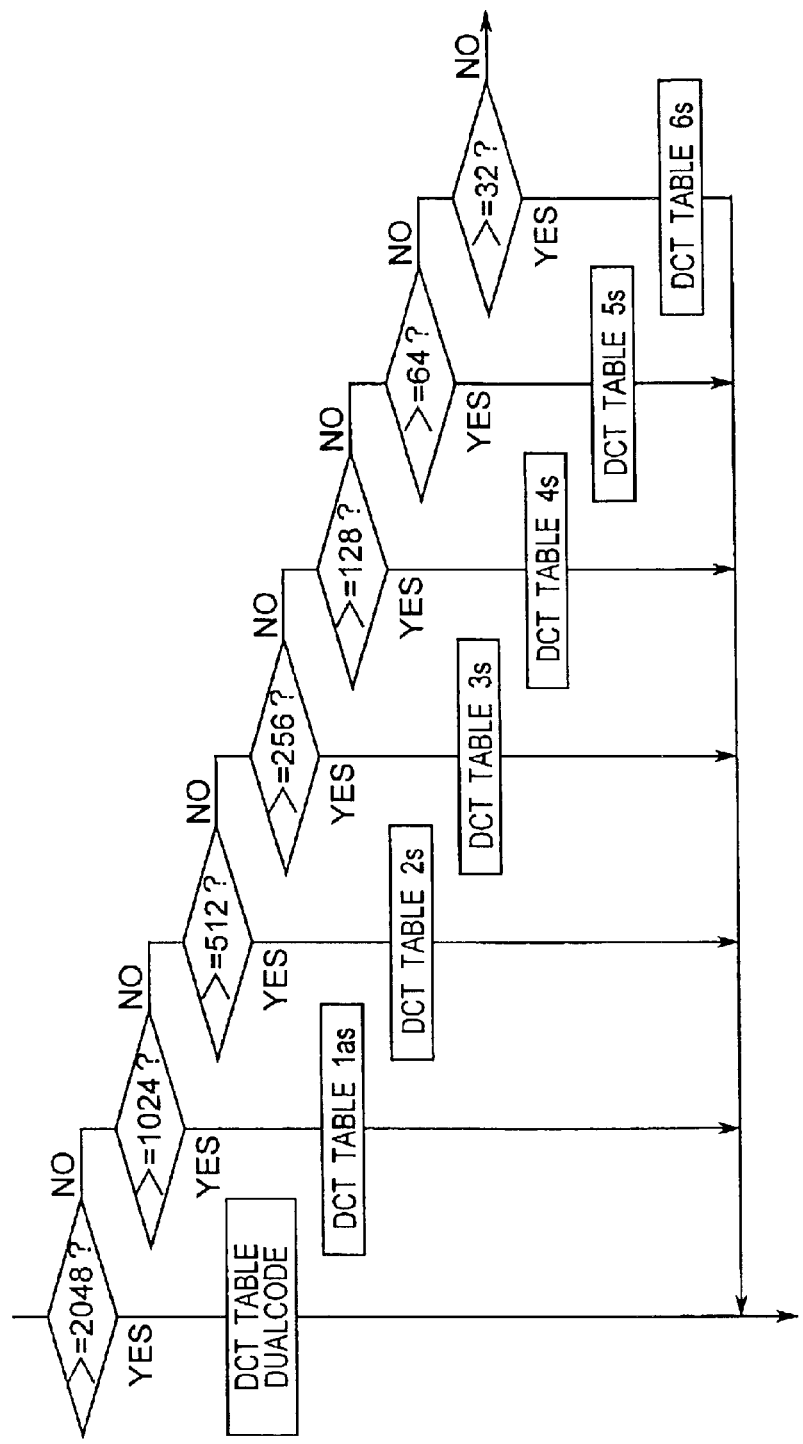
FIG. 17 is a flowchart of selecting DCT tables for intra macroblock with intra vlc format.

FIG. 16 illustrates a flowchart of decoding the intra macroblocks. FIG. 17 further illustrates a flowchart of selecting DCT tables. If peeking the value of 17 bits is either greater than or equal to 2048, the decoder selects the table 'DCT Table DualCode' and tries to decode two codes at one iteration as possible as it can, at least one code can be decoded at the iteration. Otherwise, comparing the smaller value to select DCT tables to decode DCT coefficients. If there is no DCT table suitable for the value of 17 bits, the decoder returns error. 'DCT table DualCode' and 'DCT table 1 as' in FIG. 17 are established using ISO/IEC 13818-2 Table-15, and other tables are established using Table-14.

Decoding DCT Coefficients for an Intra Macroblock with Non-Intra vlc Format

Figure 18:
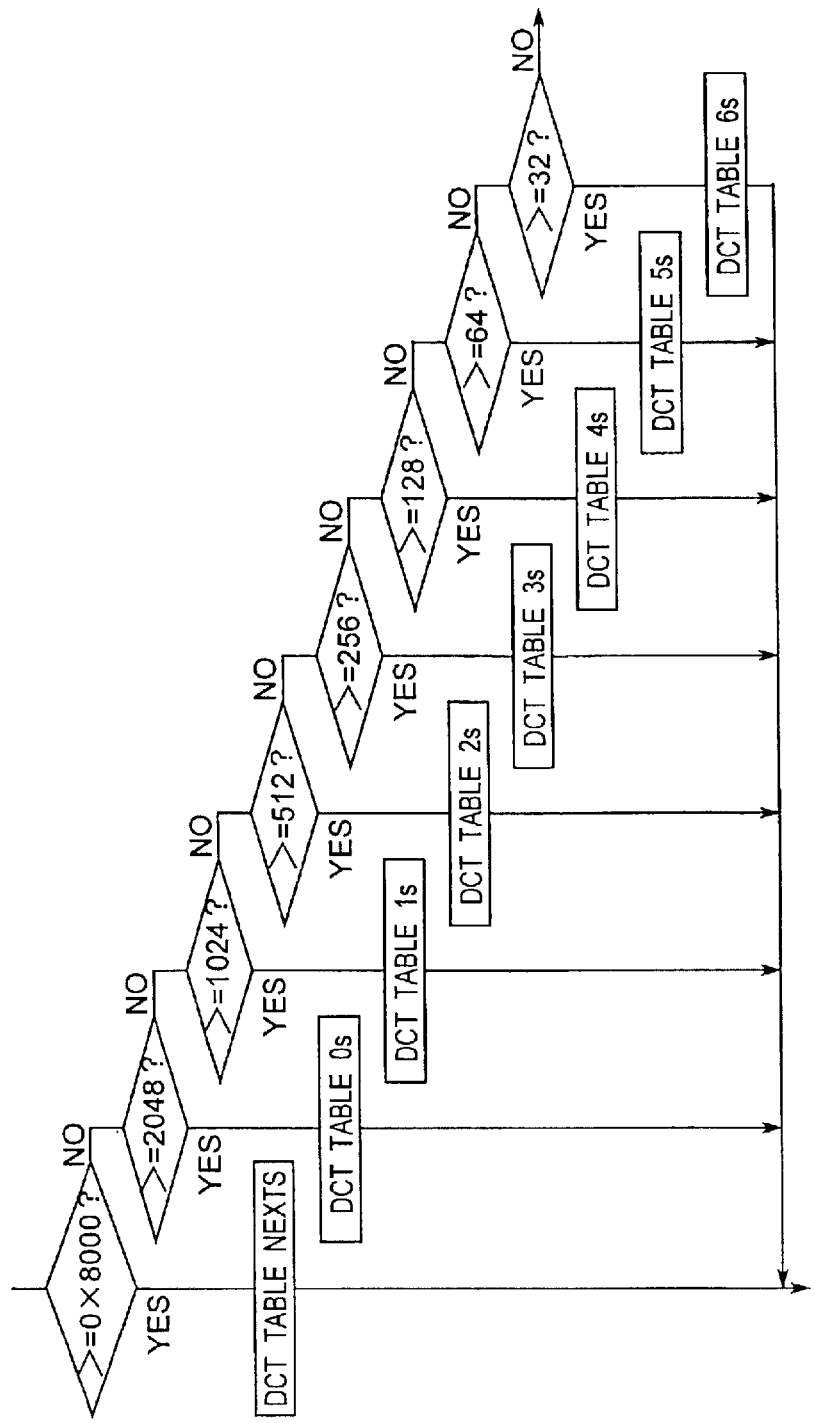
FIG. 18 is a flowchart of selecting DCT Tables for intra macroblock with non-intra vlc format and for non-intra macroblock.

The flowchart of decoding DCT coefficients for an intra macroblock with non-intra vlc format is also shown in FIG. 16. FIG. 18 shows a flowchart of selecting DCT tables for decoding DCT coefficients for intra macroblock with non-intra vlc format. All DCT tables are established using ISO/IEC 13818-2 Table-14. 'DCT table nexts' is established using variable length codes '10', '1s', '11s', '011s', '0100s', and '0101s' that include End of Block.

Decoding DCT Coefficients for a Non-Intra Macroblock

Figure 19:
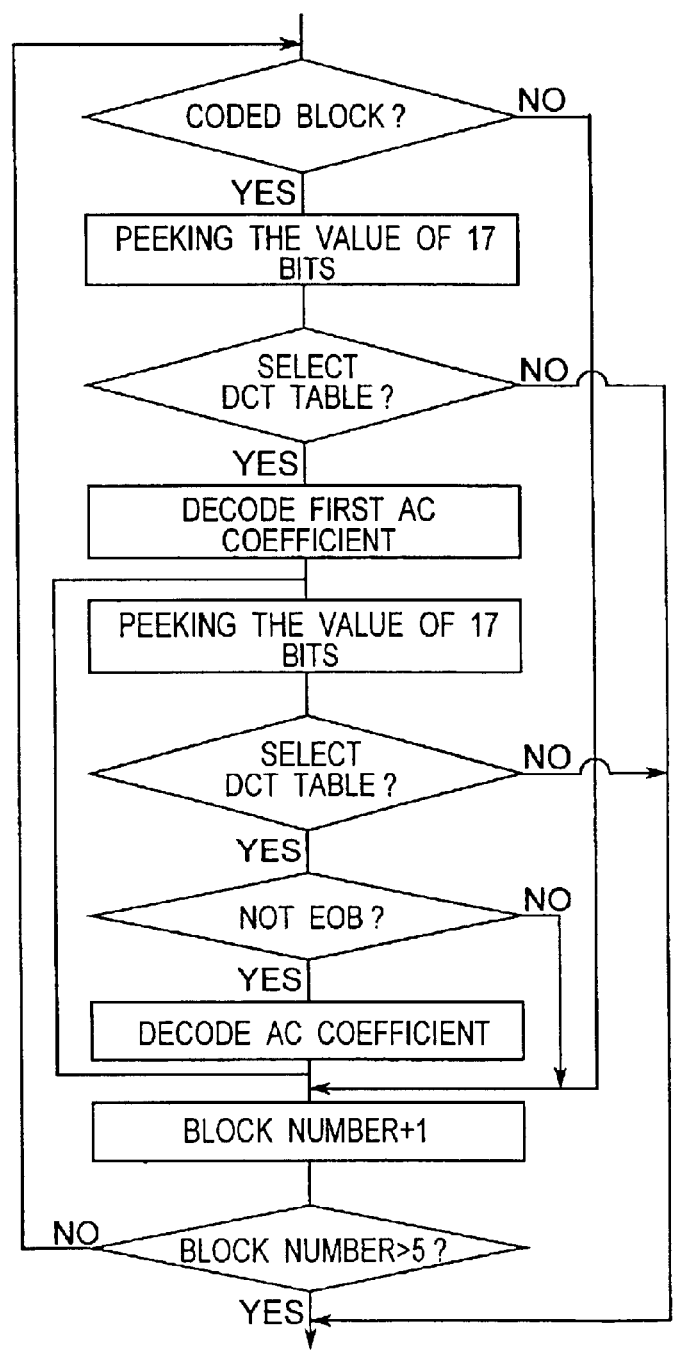
FIG. 19 is a flowchart of decoding DCT coeffiecients for non-intra macroblock.

FIG. 19 illustrates a flowchart of decoding DCT coefficients for non-intra macroblocks. FIG. 20 shows a flowchart of selecting DCT tables for the first DCT coefficient of blocks in non-intra macroblocks. FIG. 18 also shows a flowchart of selecting DCT tables for decoding DCT coefficients for non-intra macroblock. All DCT tables are established using ISO/IEC 13818-2 Table-14. The 'DCT table firsts' is established using variable length codes '1s', '11s', '0100s', and '0101s' that do not include End of Block.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The present disclosure relates to subject matter contained in priority Japanese Patent Application No. 2001-366286, filed on Nov. 30, 2001, the contents of which is herein expressly incorporated by reference in its entirety.

What is claimed is:

1. A method of MPEG-2 video variable length decoding in software, comprising steps of:

parsing bits using embedded assembly instructions and MMX technology;

decoding macroblock address increment by first checking the increment value one;

decoding motion code using a new designed variable length code tables including sign bit; and decoding DCT coefficients of macroblock using said new designed variable length code tables including sign bit.

2. A method of MPEG-2 video variable length decoding in software according to claim 1, wherein said parsing bits using embedded assembly instructions and MMX technology comprises steps of:

initializing a 64-bit buffer using the embedded assembly instructions;

peeking the value of certain bits from said 64-bit buffer using embedded assembly instructions;

flushing certain bits from said 64-bit buffer; and obtaining the value of certain bits from said 64-bit buffer.

3. A method of MPEG-2 video variable length decoding in software according to claim 1, wherein said decoding DCT coefficients of macroblock using the new designed variable length code tables of DCT coefficient including the sign bit comprises steps of:

clearing macroblock using MMX technology;

decoding DCT coefficients for an intra macroblock with intra vlc format;

decoding DCT coefficients for an intra macroblock with non-intra vlc format; and decoding DCT coefficients for a non-intra macroblock.

* * * * *